United States Patent
Lee et al.

(10) Patent No.: US 7,587,168 B2
(45) Date of Patent: Sep. 8, 2009

(54) CONDITIONAL ACCESS METHOD AND DMB SYSTEM FOR REGIONALLY LIMITING DMB RECEPTION

(75) Inventors: Ho-Jun Lee, Hwaseong-si (KR); Dong-Jun Kum, Anyang-si (KR); Beom-Soo Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 526 days.

(21) Appl. No.: 11/435,514

(22) Filed: May 17, 2006

(65) Prior Publication Data

US 2007/0002885 A1    Jan. 4, 2007

(30) Foreign Application Priority Data

Jun. 16, 2005    (KR)    .................. 10-2005-0052093

(51) Int. Cl.
*H04H 1/00*    (2006.01)
(52) U.S. Cl. ............. 455/3.01; 455/456.3; 455/503; 455/515
(58) Field of Classification Search ....... 455/3.01–3.06, 455/414.1–414.4, 411, 415, 456.1–456.3, 455/517, 12.1, 503, 515, 412.2, 434; 714/758; 370/432

See application file for complete search history.

(56) References Cited

U.S. PATENT DOCUMENTS

2003/0181160 A1* 9/2003 Hirsch ................ 455/3.02
2005/0047448 A1* 3/2005 Lee et al. ............. 370/536
2005/0160343 A1* 7/2005 Ji ........................ 714/758

FOREIGN PATENT DOCUMENTS

| AU | 200167114 | 11/2001 |
|---|---|---|
| FR | 2861237 | 4/2005 |
| KR | 2002-31626 | 5/2002 |

OTHER PUBLICATIONS

Satellite Earth Stations and Systems (SES); Broadband Satellite Multimedia (BSM); Security Aspects; ETSI, Oct. 2003.
Digital Audio Broadcasting (DAB); Conditional Access; ETSI, Jan. 2005.

* cited by examiner

*Primary Examiner*—John J Lee
(74) *Attorney, Agent, or Firm*—The Farrell Law Firm, LLP

(57) ABSTRACT

A digital multimedia broadcasting (DMB) system and conditional access method for regionally limiting DMB reception. A DMB station collects information about location of a DMB receiving terminal when a broadcast channel with regional conditional access features is being broadcast. According to the current location of a DMB receiving terminal, the DMB station checks subscribers whose reception of the broadcast channel with the regional conditional reception features is limited. The DMB station includes reception restriction information for limiting the reception of the broadcast channel in subscriber entitlement information of subscribers. The DMB receiving terminal descrambles and outputs a transport stream (TS) packet of the broadcast channel according to the received subscriber entitlement information. Therefore, the reception of a specific broadcast channel can be limited according to location of a user of the DMB receiving terminal.

16 Claims, 7 Drawing Sheets

CONDITIONAL ACCESS METHOD AND DMB SYSTEM FOR REGIONALLY LIMITING DMB RECEPTION

PRIORITY

This application claims priority under 35 U.S.C. § 119 to an application entitled "Conditional Access Method and DMB System for Regionally Limiting DMB Reception" filed in the Korean Intellectual Property Office on Jun. 16, 2005 and assigned Serial No. 2005-52093, the contents of which are incorporated herein by reference.

BACKGROUND OF THE INVENTION

1. Field of the Invention

The present invention generally relates to a digital multimedia broadcasting (DMB) system, and more particularly, to a conditional access system (CAS) for DMB.

2. Description of the Related Art

Generally, a conditional access system (CAS) is a system for ensuring that pay broadcasts are only accessible to those who are entitled to watch them. The CAS performs a function for limiting access to services such that subscribers can receive the services only when paying viewing fees. That is, the CAS is the technology enabling "pay services" to be provided. When the broadcast content is scrambled and transmitted receivers are permitted to receive broadcast content only if viewing fees are paid.

FIG. 1 illustrates an exemplary structure of a digital multimedia broadcasting (DMB) system in which the CAS is implemented. Referring to FIG. 1, a DMB station 100 scrambles compressed audio, video and data streams using subscriber information stored in the DMB system. An entitlement control message (ECM) indicating conditional access features for specific broadcast content or a specific broadcast channel and a message indicating a subscriber's entitlement based on the subscriber information (i.e., a subscriber-by-subscriber entitlement management message (EMM)) are multiplexed along with the scrambled streams. Then, a plurality of stream packets (hereinafter, referred to as transport stream (TS) packets) are sent to a DMB satellite 104.

Then, the DMB satellite 104 sends the TS packets to a DMB receiving terminal 102 on the ground. The DMB receiving terminal 102 receives and demultiplexes the scrambled TS packets from the DMB satellite 104 and extracts the ECM from the TS packets. The DMB receiving terminal 102 detects the presence of conditional access features for the specific broadcast content or the specific broadcast channel from the extracted ECM, and checks the EMM to determine if the reception of the broadcast content for the subscriber is limited through the subscriber information stored in the DMB receiving terminal 102. If it is determined that the subscriber is entitled to receive the broadcast content using the EMM, the DMB receiving terminal 102 descrambles the scrambled TS packets, such that a user can watch DMB. However, if it is determined that the subscriber is not entitled to receive the specific broadcast content using the EMM, the DMB receiving terminal 102 does not descramble the scrambled TS packets, such that the user cannot watch the specific broadcast content.

Because the broadcast content is collectively broadcast to DMB receiving terminals on the ground in case of DMB using the DMB satellite, a spillover phenomenon occurs in which the DMB is provided to an undesired region. When the DMB system broadcasts any broadcast content or broadcast channel limited to a specific region, TS packets may be received from the DMB satellite 104 regardless of a region. There is a problem in that the conventional DMB system cannot limit the reception of specific broadcast content in a specific region.

The ECM indicating conditional access features for specific broadcast content and the EMM indicating if the subscriber is entitled to receive the broadcast content can limit the reception of the specific broadcast content for the subscriber. These are only provided as means for limiting the reception of the broadcast content itself as in pay broadcast content or parental ratings for the broadcast content. However, the EMM and ECM do not provide regional conditional access features according to location of the DMB receiving terminal. There is a problem in that limiting the reception of specific broadcast content or a specific broadcast channel only in a specific region is impossible or various service fee systems cannot be provided to users according to DMB reception regions of the users.

SUMMARY OF THE INVENTION

It is, therefore, an object of the present invention to provide a digital multimedia broadcasting (DMB) system and conditional access method that can limit the reception of broadcast content or a broadcast channel with regional conditional access features according to a current location of a DMB receiving terminal in a conditional access system (CAS) of the DMB system.

The above and other objects of the present invention can be achieved by a digital multimedia broadcasting (DMB) system, including a DMB receiving terminal for limiting reception of a broadcast channel according to regional conditional access features of the broadcast channel selected by a user; and a DMB station for including and broadcasting reception restriction information for limiting the reception of the broadcast channel for a subscriber according to a region in which the DMB receiving terminal is located.

The above and other objects of the present invention can also be achieved by a conditional access method, including determining if there is present a broadcast channel with regional conditional access features for regionally limiting reception by digital multimedia broadcasting (DMB) receiving terminals among broadcast channels in a DMB station; collecting location information from the DMB receiving terminals in the DMB station; checking a subscriber of a DMB receiving terminal whose reception of the broadcast channel with the regional conditional access features is limited using the location information and generating and broadcasting reception restriction information for limiting the reception of the broadcast channel from the DMB station; and limiting the reception of the broadcast channel for a user according to whether the reception restriction information has been received for the broadcast channel selected by the user in the DMB receiving terminal.

BRIEF DESCRIPTION OF THE DRAWINGS

The above and other objects and advantages of the present invention will be more clearly understood from the following detailed description taken in conjunction with the accompanying drawings, in which.

DETAILED DESCRIPTION OF THE PREFERRED EMBODIMENTS

Figure 1:
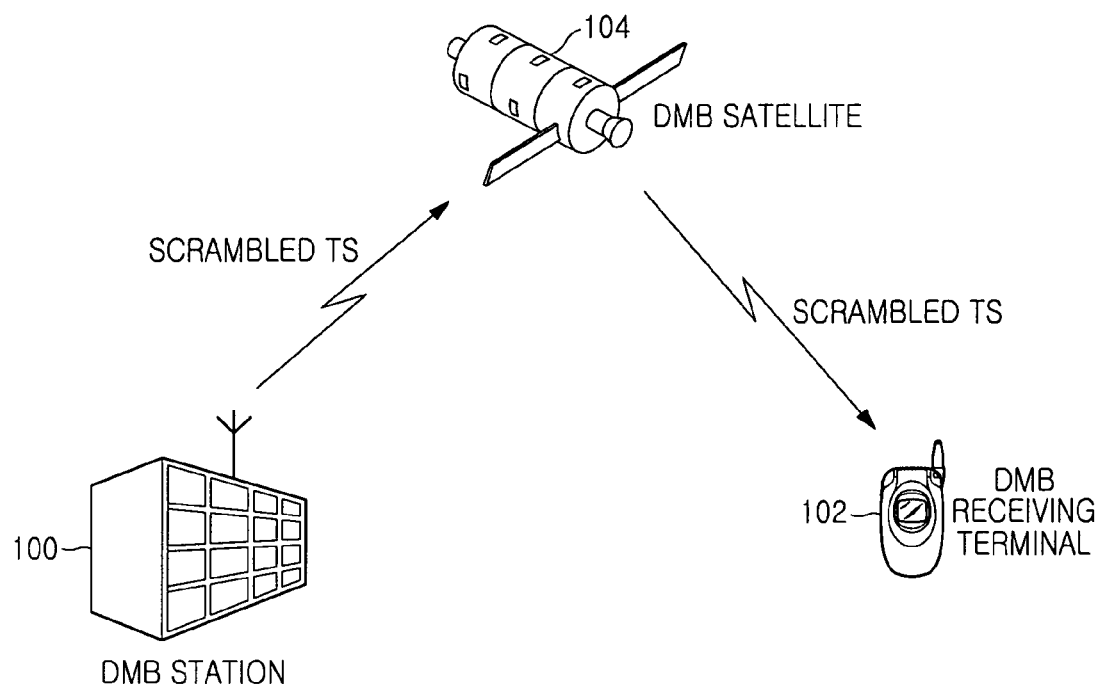
FIG. 1 illustrates an example of a conventional digital multimedia broadcasting (DMB) system.

Preferred embodiments of the present invention will be described in detail herein below with reference to the accompanying drawings. In the drawings, the same or similar elements are denoted by the same reference numerals even though they are depicted in different drawings. In the following description, detailed descriptions of functions and configurations incorporated herein that are well known to those skilled in the art are omitted for clarity and conciseness. The present invention can be applied for broadcast content such as a specific broadcast program, but an example in which the present invention is applied for a broadcast channel will be described for convenience of explanation.

First, a basic principle of the present invention will be described to help a better understanding of the present invention. In the present invention, a digital multimedia broadcasting (DMB) station collects information about location of a DMB receiving terminal when a broadcast channel with regional conditional access features is being broadcast. Here, the DMB station can collect the location information received by the DMB receiving terminal from a Global Positioning System (GPS) satellite. Of course, when the DMB receiving terminal can interwork with a mobile communication network, the DMB station can collect the location information from a base station (BS) of the mobile communication network. The DMB station checks those subscribers for whom reception of the broadcast channel with the regional conditional access features is limited.

For the subscribers determined as being located in a limited region according to the regional conditional access features of the broadcast channel, reception restriction information is generated to limit the reception of the broadcast channel. Here, the reception restriction information can be included in subscriber entitlement information. In accordance with an embodiment of the present invention, the DMB station generates and transmits information indicating if a user of the DMB receiving terminal can watch a specific broadcast channel in a region in which the DMB receiving terminal is located. On the basis of subscriber entitlement information, the DMB receiving terminal descrambles TS packets of the broadcast channel and outputs the descrambled packets. Therefore, the present invention can limit the reception of the specific broadcast channel according to the region in which the user of the DMB receiving terminal is located.

Figure 2:
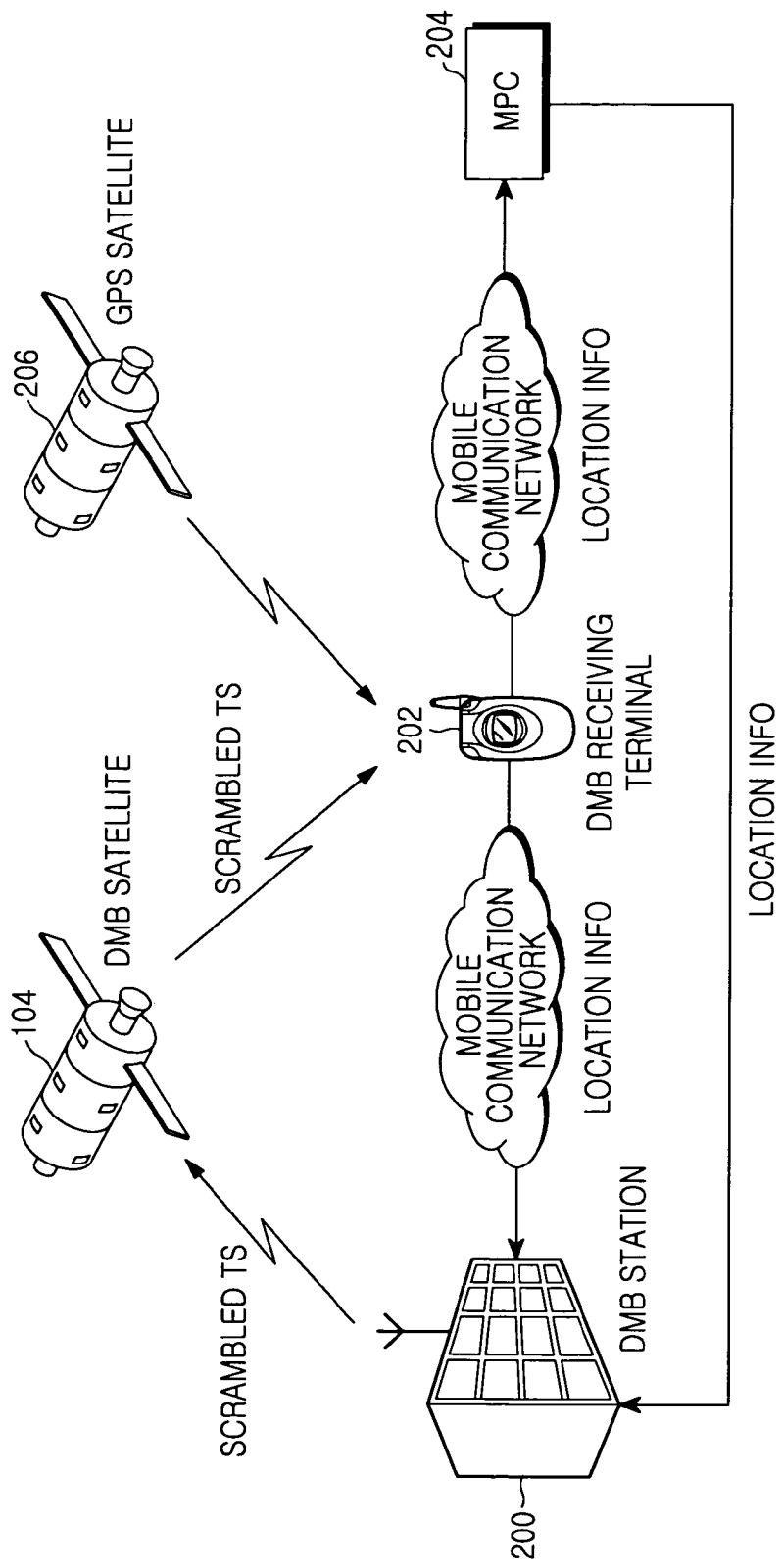
FIG. 2 is an example of a DMB system in accordance with the present invention.

FIG. 2 is an example of a DMB system in accordance with the present invention. Referring to FIG. 2, the DMB system is provided with a DMB receiving terminal 202 and a DMB station 200. The DMB receiving terminal 202 provides location information to the DMB station 200 using a GPS satellite 206 or a mobile positioning center (MPC) 204. The DMB station 200 receives the location information of the DMB receiving terminal 202 from the MPC 204, and scrambles audio, video, and data streams using prestored subscriber information of the DMB receiving terminal 202. Then, the DMB station 200 extracts conditional access information of an associated channel, i.e., an entitlement control message (ECM), from program specific information (PSI) of broadcast channels, and generates an entitlement management message (EMM) indicating if the broadcast channel can be watched in a region in which the subscriber is located from the extracted ECM. Then, the DMB station 200 multiplexes the ECM, the EMM, and the scrambled streams, and sends a result of the multiplexing to the DMB satellite 104.

When the DMB receiving terminal 202 receives a GPS signal to obtain its own location information, the GPS satellite 206 can provide GPS location information of the DMB receiving terminal 202 according to a period or conditions preset in the DMB receiving terminal 202. In this case, the DMB receiving terminal 202 receives its own location information from the GPS satellite 206, and sends the received location information through a transmission path connected to the DMB station 200. FIG. 2 illustrates an example of the transmission path using a mobile communication network based on code division multiple access (CDMA) or a global system for mobile communications (GSM). However, if the DMB receiving terminal 202 uses both a DMB reception function and a mobile phone function, a mobile communication system requests that the MPC 204 (used for collecting and managing the location information of a mobile communication terminal) send the location information of the DMB receiving terminal 202 as illustrated in FIG. 2. The mobile communication system can receive the location information of the DMB receiving terminal 202 from the MPC 204, as a response to the request, and can send the current location information of the DMB receiving terminal 202 to the DMB station 200.

Figure 3A:
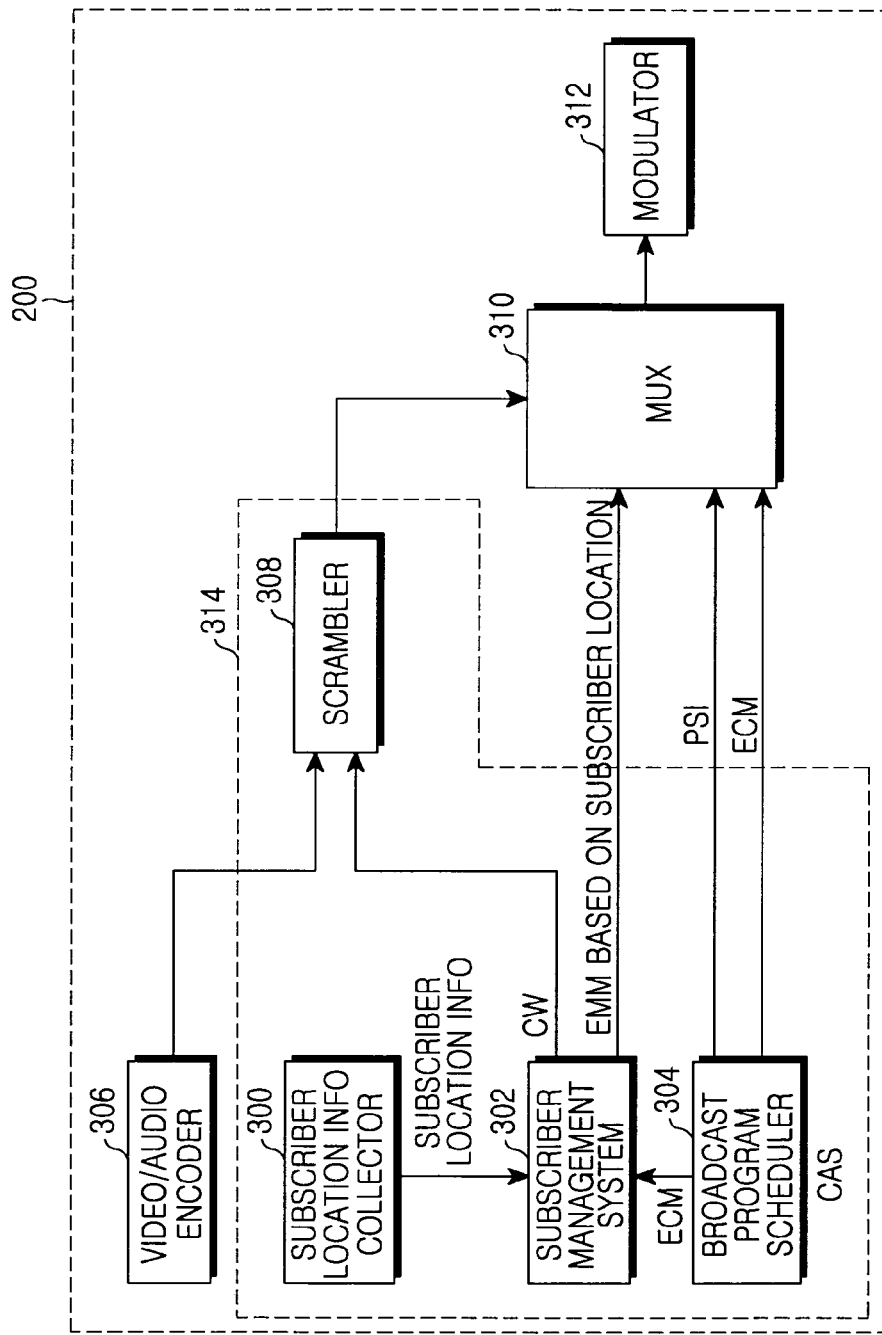
FIG. 3A is a block diagram illustrating an exemplary structure of a DMB station in the DMB system in accordance with the present invention.

FIG. 3A is a block diagram illustrating an exemplary structure of the DMB station 200 of FIG. 2 with a conditional access system (CAS) in accordance with the present invention. Referring to FIG. 3A, the DMB station 200 is provided with the CAS 314, a video/audio encoder 306, a multiplexer 310, and a modulator 312. The CAS 314 is provided with a subscriber management system 302, a broadcast program scheduler 304, a subscriber location information collector 300, and a scrambler 308. The video/audio encoder 306 encodes a broadcast signal including input video and audio signals. The scrambler 308 scrambles the broadcast signal. The multiplexer 310 multiplexes the scrambled broadcast signal and various signals output from the CAS 314 into a TS packet. The modulator 312 modulates the TS packet and sends the modulated TS packet to the DMB satellite 104. In accordance with an embodiment of the present invention, the broadcast program scheduler 304 of the CAS 314 manages information about broadcast channels and generates PSI and channel-by-channel conditional access information (ECM) including region-by-region conditional access features of the broadcast channels. The generated PSI and channel-by-channel conditional access information are input to the multiplexer 310.

When a broadcast channel with the regional conditional access features is present among channels currently being broadcast, the subscriber location information collector 300 of the CAS 314 receives current location information from the DMB receiving terminal 202 or requests that the MPC 204 coupled to the DMB receiving terminal 202 send the location information of the DMB receiving terminal 202. The subscriber location information collector 300 receives the location information of the DMB receiving terminal 202 as a response to the request. The subscriber management system 302 of the CAS 314 manages subscriber entitlement information based on subscriber information. The subscriber management system 302 compares prestored subscriber information of the DMB receiving terminal 202 and the current location information of the DMB receiving terminal 202 input from the subscriber location information collector 300 with the channel-by-channel conditional access information (ECM). The subscriber management system 302 generates reception restriction information indicating if the subscribers can watch the broadcast channel. The reception restriction information can be included in subscriber entitlement information (EMM).

Even when the subscriber of the DMB receiving terminal 202 is located in a region in which the broadcasting reception is limited, he or she may be entitled to watch the broadcast according to the subscriber information. In this case, the subscriber management system 302 does not generate reception restriction information for limiting the reception of the broadcast channel even when the DMB receiving terminal 202 is located in a region in which the reception is limited according to regional conditional access features of the broadcast channel. Moreover, the subscriber management system 302 generates a control word (CW) from the subscriber information. Here, the CW indicates a key used for scrambling a broadcast signal including video and audio signals. The subscriber management system 302 inputs the generated CW to the scrambler 308 and then inputs the generated EMM to the multiplexer 310.

After receiving the CW from the subscriber management system 302, the scrambler 308 scrambles the broadcast signal with the CW. The scrambled broadcast signal is input to the multiplexer 310. Then, the multiplexer 310 multiplexes the broadcast signal, the channel-by-channel conditional access information (ECM), the subscriber entitlement information (EMM), and the PSI into a TS packet, and outputs a result of the multiplexing to the modulator 312. The modulator 312 modulates the input TS packet and then sends the modulated packet to the DMB satellite 104. The DMB station 200 with the CAS 314 broadcasts the subscriber entitlement information indicating if the user is entitled to watch a specific broadcast channel with the regional conditional access features in a region in which the user is located. When receiving the subscriber entitlement information, the DMB receiving terminal 202 can determine if the user can currently watch the broadcast channel with the regional conditional access features from the subscriber entitlement information. The DMB system can limit the reception of the specific broadcast channel according to the current location of the user. The operation of the DMB station 200 with the CAS 314 in accordance with the embodiment of the present invention will be described in more detail with reference to FIG. 4.

Figure 3B:
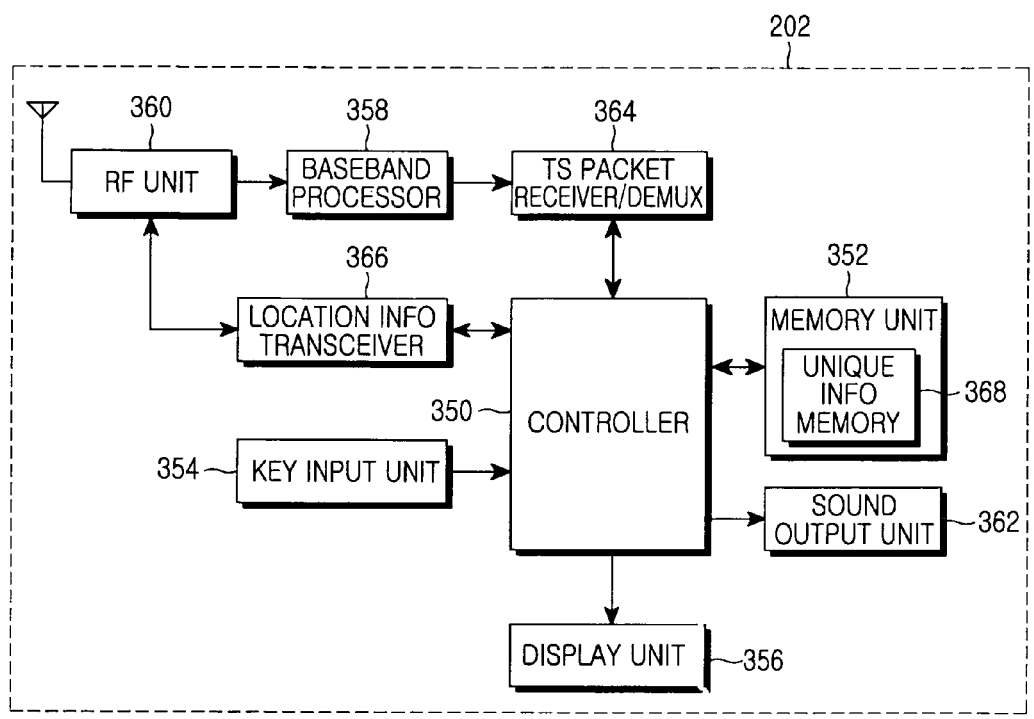
FIG. 3B is a block diagram illustrating an exemplary structure of a DMB receiving terminal in the DMB system in accordance with the present invention.

FIG. 3B is a block diagram illustrating an exemplary structure of the DMB receiving terminal 202 of the DMB system with the CAS 314 in accordance with the present invention. Referring to FIG. 3B, the DMB receiving terminal 202 of the DMB system is provided with a memory 352, a key input unit 354, a display unit 356, a baseband processor 358, a sound output unit 362, a TS packet receiver/demultiplexer 364, and a controller 350 connected thereto. Here, the controller 350 processes a TS packet received from the DMB satellite 104 according to a preset protocol and controls the respective components of the DMB receiving terminal 202. Moreover, the controller 350 can receive a key input by the user from the key input unit 354 and set a channel selected by the user. The controller 350 controls the display unit 356 and the sound output unit 362 to output image and sound information of the broadcast channel selected by the user according to the set channel.

The memory 352 connected to the controller 350 is configured by a read only memory (ROM), a flash memory, a random access memory (RAM), a unique information memory 368, and so on. Among these memories, the ROM stores a program for processing and control operations of the controller 350 and various types of reference data. The RAM provides a working memory of the controller 350. The flash memory provides an area for storing various types of data capable of being updated. The unique information memory 368 stores unique information of the subscriber of the DMB receiving terminal 202. Here, the unique information memory 368 may be a subscriber identification module card or integrated circuit (IC) card.

The key input unit 354 is provided with various keys including numeric keys and provides a key input from the user to the controller 350. A radio frequency (RF) unit 360 receives an RF signal corresponding to a modulated TS packet. The received RF signal is converted into an intermediate frequency (IF) signal and outputs the converted signal to the baseband processor 358 connected to the controller 350. The baseband processor 358 serves as a baseband analog application specific integrated circuit (ASIC) (BBA) for providing an interface between the controller 350 and the RF unit 360. The baseband processor 358 converts an analog IF signal applied from the RF unit 360 into a digital baseband signal and then applies the digital baseband signal to the controller 350.

When the DMB receiving terminal 202 receives the location information from the GPS satellite 206, a location information transceiver 366 connected to the controller 350 receives the location information of the DMB receiving terminal 202 from the GPS satellite 206 if a preset period expires according to a control operation of the controller 350 and then transmits the received location information to the DMB station 200. On the other hand, when the DMB receiving terminal 202 is coupled to the MPC 204 through the mobile communication network, the location information transceiver 366 may not need to be provided by the DMB receiving terminal 202. In this case, the MPC 204 coupled to the DMB receiving terminal 202 sends the location information of the DMB receiving terminal 202 as a response to a request of the DMB station 200 according to a preset period, or sends the location information of the DMB receiving terminal 202 to the DMB station 200 if a preset condition is satisfied. For example, the preset condition may be a case where the location of the DMB receiving terminal is changed when a handover for the DMB receiving terminal 202 occurs.

The TS packet receiver/demultiplexer 364 connected to the controller 350 receives and demultiplexes a TS packet corresponding to a digital signal input from the baseband processor 358. Here, the TS packet receiver/demultiplexer 364 searches for and identifies a packet identifier (ID) (PID) allocated to subscriber entitlement information (EMM) from a conditional access table (CAT) included in PSI, and searches for an EMM stream. The entitlement information (EMM) is extracted from the EMM stream. A determination is made as to whether the subscriber of the DMB receiving terminal 202 is entitled to watch broadcast content or a broadcast channel currently selected by the user using the extracted EMM. If the subscriber of the DMB receiving terminal 202 is entitled to watch the broadcast channel, a scrambled broadcast signal is descrambled using the subscriber information. In accordance with the embodiment of the present invention, the DMB system with the CAS 314 can limit the reception of the broadcast content or channel with the regional conditional access features according to the current location of the DMB receiving terminal 202.

Figure 3C:
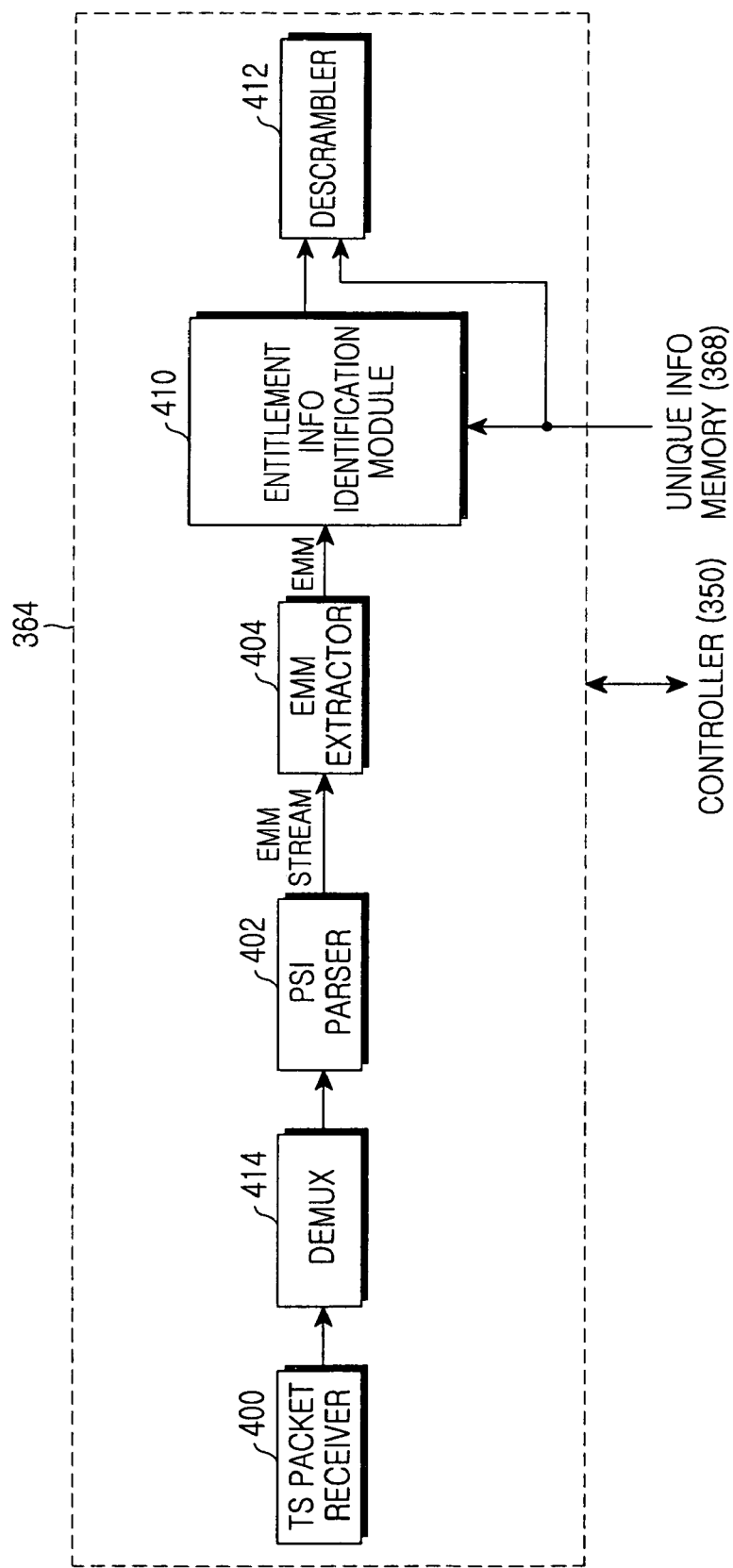
FIG. 3C is a block diagram illustrating an exemplary structure of a transport stream (TS) packet receiver/demultiplexer in the DMB receiving terminal of the DMB system in accordance with the present invention.

FIG. 3C is a block diagram illustrating an exemplary structure of the TS packet receiver/demultiplexer 364 in the DMB receiving terminal 202 of the DMB system with the CAS 314 in accordance with the present invention. Referring to FIG. 3C, the TS packet receiver/demultiplexer 364 is provided with a TS packet receiver 400, a demultiplexer 414, a PSI parser 402, an EMM extractor 404, an entitlement information identification module 410, and a descrambler 412. The TS packet receiver 400 receives and buffers a TS packet. The demultiplexer 414 demultiplexes the received TS packet. The PSI parser 402 parses the PSI of a service description table (SDT), program association table (PAT), program map table (PMT), CAT, and so on. The EMM extractor 404 searches for a PID of an EMM stream through the parsed PSI, and extracts the subscriber entitlement information (EMM) using the searched PID of the EMM stream. The entitlement information identification module 410 determines if the subscriber, i.e., the user of the DMB receiving terminal 202, is entitled to watch broadcast content or a broadcast channel through the subscriber entitlement information (EMM) and the subscriber unique information stored in the unique information memory 368. If the user is entitled to watch the broadcast channel, the entitlement information identification module 410 generates a CW to descramble a scrambled broadcast signal using the subscriber unique information input from the unique information memory 368. The descrambler 412 receives the CW from the entitlement information identification module 410 and descrambles the broadcast signal demultiplexed by the demultiplexer 414.

The channel-by-channel conditional access information (ECM) indicating the regional conditional access features for a broadcast channel is included in the PSI and then the PSI is transmitted to the DMB receiving terminal 202. The subscriber entitlement information (EMM) includes information indicating if the user can watch a broadcast channel with the regional conditional access features, i.e., the reception restriction information, according to location information of the DMB receiving terminal 202 sent from the DMB receiving terminal 202. The DMB system with the CAS 314 can determine if the user of the DMB receiving terminal 202 can watch the broadcast channel with the regional conditional access features for limiting the broadcast according to the current location of the user when the EMM extractor 404 provided in the TS packet receiver/demultiplexer 364 of the DMB receiving terminal 202 extracts the EMM.

When the reception restriction information for the broadcast channel is not included in the entitlement information (EMM), the entitlement information identification module 410 receives unique information of the subscriber, generates a CW, i.e., a descrambling key, from the received unique information, and descrambles a broadcast signal demultiplexed by the demultiplexer 414 using the generated CW. When the reception restriction information is not included in the subscriber entitlement information, the user can watch the broadcast channel with the regional conditional access features. However, when the reception restriction information is included in the subscriber entitlement information, the reception of the broadcast channel for the user is limited. The operation of the TS packet receiver/demultiplexer 364 in accordance with the embodiment of the present invention will be described with reference to FIG. 5.

Figure 4:
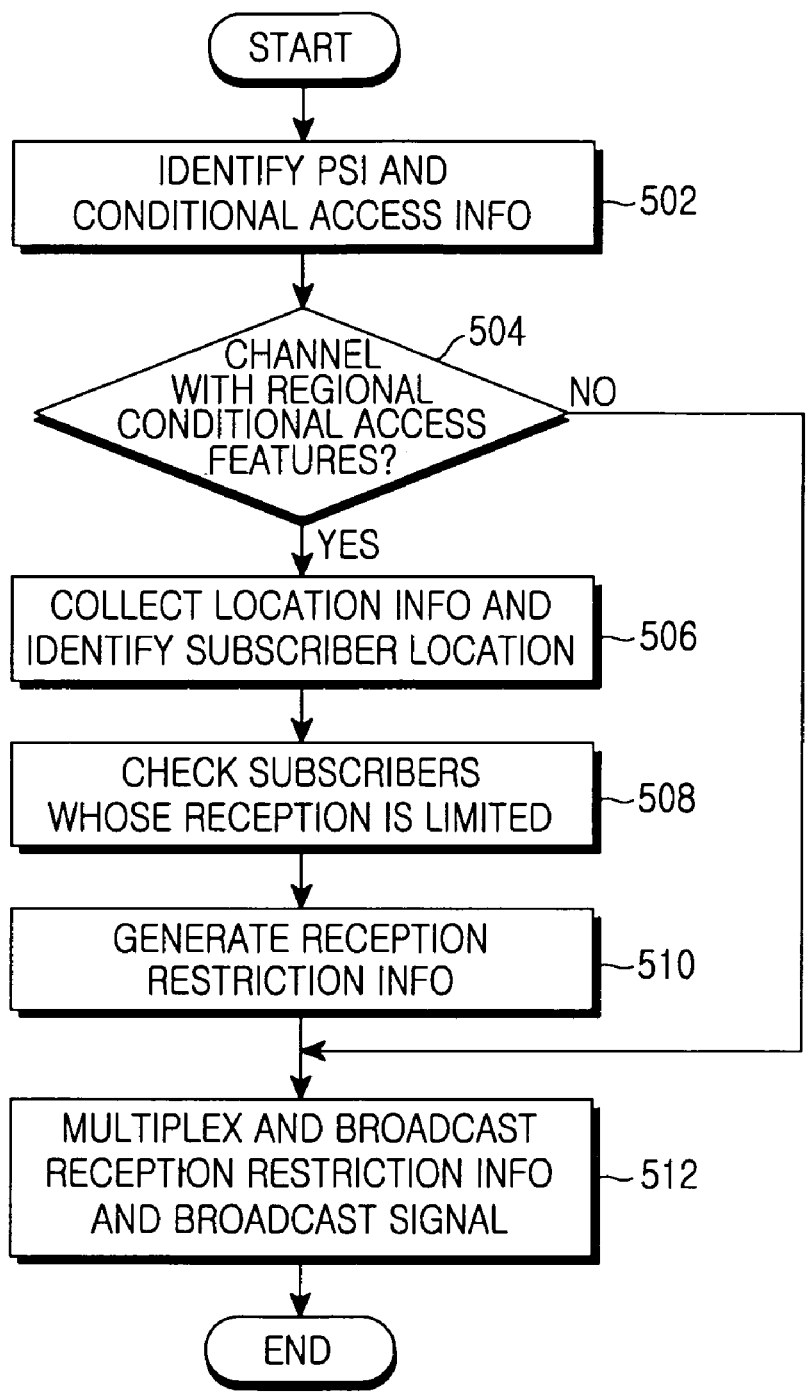
FIG. 4 is a flowchart illustrating an operation for generating an entitlement management message (EMM) with regional conditional access features in the DMB station of the DMB system in accordance with the present invention.

FIG. 4 is a flowchart illustrating an operation for generating subscriber entitlement information for a broadcast channel with regional conditional access features according to the current location of the DMB receiving terminal 202 using location information input from the DMB receiving terminal 202 in the CAS 314 in accordance with the present invention. Referring to FIG. 4, the CAS 314 of the DMB station 200 proceeds to step 502 to identify channel schedule information of a broadcast channel currently being broadcast, i.e., the PSI, and channel-by-channel conditional access information for each broadcast channel from the broadcast program scheduler 304. Then, the CAS 314 proceeds to step 504 to determine if there is present a broadcast channel with the regional conditional access features for limiting the reception of a broadcast according to location of the subscriber from the channel-by-channel conditional access information.

If a broadcast channel with the regional conditional access features is included in the broadcast channels currently being broadcast in step 504, a region based on the current location of subscribers is identified through the location information in step 506. Then, the subscriber management system 302 of the CAS 314 proceeds to step 508 to check subscribers whose reception of broadcast channels with the regional conditional access features is limited in regions in which the subscribers are located. When the number of broadcast channels with the regional conditional access features is multiple, the subscribers whose reception is limited are checked for each broadcast channel with the regional conditional access features. Then, the subscriber management system 302 proceeds to step 510 to generate reception restriction information for limiting the reception of a broadcast channel with the regional conditional access features for the subscribers. The reception restriction information can be included in the subscriber entitlement information. The CAS 314 generates the subscriber entitlement information including information indicating if a subscriber is entitled to watch a specific broadcast channel according to the location of the DMB receiving terminal 202. The multiplexer 310 multiplexes the generated EMM and the scrambled broadcast signal output from the scrambler 308 and then sends a TS packet. Therefore, the present invention can limit the reception of a specific broadcast channel according to the location of the DMB receiving terminal 202 using the subscriber entitlement information including information indicating if a subscriber is entitled to watch a broadcast channel with the regional conditional access features.

Figure 5:
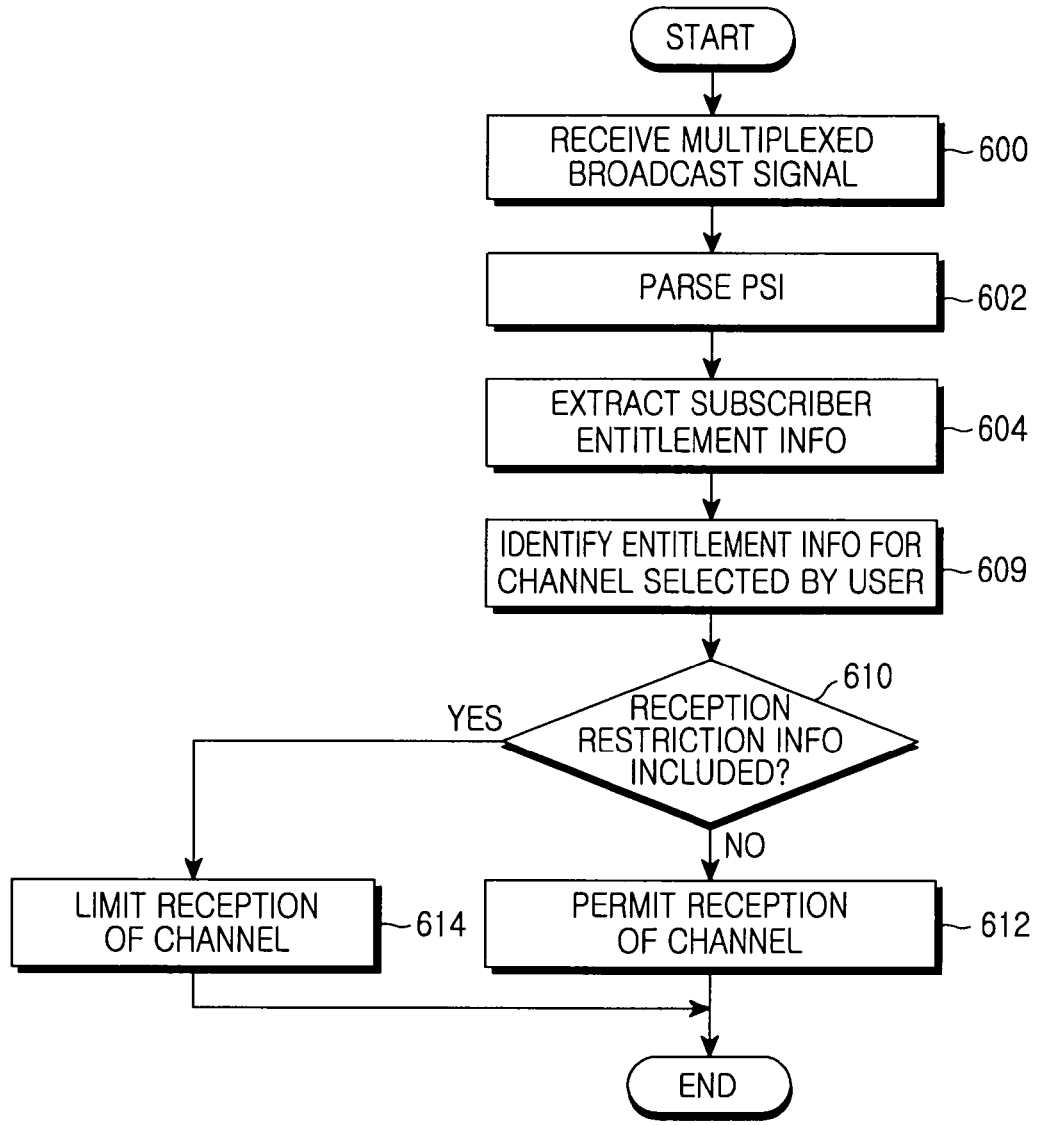
FIG. 5 is a flowchart illustrating an operation for descrambling TS packets according to the EMM received by the TS packet receiver/demultiplexer in the DMB receiving terminal of the DMB system in accordance with the present invention.

FIG. 5 is a flowchart illustrating an operation for descrambling TS packets according to received subscriber entitlement information in the TS packet receiver/demultiplexer 364 of the DMB receiving terminal 202 of the DMB system in accordance with the present invention. Referring to FIG. 5, the TS packet receiver/demultiplexer 364 for receiving the TS packets using the TS packet receiver 400 proceeds to step 600 to receive the TS packets. Then, the TS packet receiver/demultiplexer 364 proceeds to step 602 to parse PSI from the received TS packets through the PSI parser 402. The PSI includes an SDT, PAT, PMT, CAT, and so on. Information such as the SDT, PAT, PMT, CAT, and so on is generated from the PSI parser 402.

Then, the TS packet receiver/demultiplexer 364 proceeds to step 604 to search for a PID mapped to an EMM stream from the generated CAT through the EMM extractor 404. Subscriber-by-subscriber entitlement information (EMM) is extracted from EMM streams. The TS packet receiver/demultiplexer 364 proceeds to step 609 to identify the subscriber entitlement information (EMM) using the entitlement information identification module 410.

The TS packet receiver/demultiplexer 364 proceeds to step 610 to determine if the user can watch the currently selected broadcast channel using the subscriber entitlement information (EMM). The entitlement information identification module 410 determines that the user is not entitled to watch the broadcast channel when reception restriction information for the broadcast channel is included in the subscriber entitlement information.

If the user is not entitled to watch the broadcast channel as a result of the determination in step 610, the TS packet receiver/demultiplexer 364 proceeds to step 614 to limit the reception of the broadcast channel. In this case, the TS packet receiver/demultiplexer 364 may perform a control operation such that the entitlement information identification module 410 does not generate a CW for descrambling a scrambled broadcast signal according to a method for limiting the reception of the broadcast channel. Therefore, when the user is not entitled to watch the broadcast channel, the broadcast channel is not descrambled and the user cannot watch the broadcast channel.

However, if the subscriber entitlement information (EMM) does not include the reception restriction information for the broadcast channel selected by the user in step 610, the TS packet receiver/demultiplexer 364 proceeds to step 612 to permit the reception of the broadcast channel. In this case, the entitlement information identification module 410 receives unique information of the subscriber from the unique information memory 368, generates a CW using the received information, and inputs the CW to the descrambler 412. Then, the descrambler 412 descrambles the scrambled broadcast signal received and demultiplexed by the TS packet receiver 400 and the demultiplexer 414 using the CW. Then, descrambled video/audio signals are input to the controller 350, such that the user can watch the broadcast channel. In accordance with the present invention, the reception of the broadcast channel is limited according to the current location of the user of the DMB receiving terminal 202 in the DMB system.

In the present invention, the DMB station collects the location information of the DMB receiving terminal when a broadcast channel with regional conditional access features is being broadcast. According to the current location of the DMB receiving terminal, the DMB station checks subscribers whose reception of the broadcast channel with the regional conditional reception features is limited. The DMB station includes reception restriction information for limiting the reception of the broadcast channel in subscriber entitlement information of subscribers. The DMB receiving terminal descrambles and outputs a TS packet of the broadcast channel according to the received subscriber entitlement information. Therefore, the present invention can limit the reception of a specific broadcast channel according to the location of the user of the DMB receiving terminal.

Although preferred embodiments of the present invention have been disclosed for illustrative purposes, those skilled in the art will appreciate that various modifications, additions, and substitutions are possible, without departing from the scope of the present invention. The example in which the DMB receiving terminal 202 is coupled to the DMB station 200 or the MPC 204 through the mobile communication network in accordance with the embodiment of the present invention has been described in relation to FIG. 2. Alternatively, the DMB receiving terminal 202 may be coupled to the DMB station 200 or the MPC 204 through a Wireless Broadband (WiBro) wireless Internet as well as the mobile communication network. Therefore, the present invention is not limited to the above-described embodiments, but is defined by the following claims, along with their full scope of equivalents.

What is claimed is:

1. A Digital Multimedia Broadcasting (DMB) system, comprising:
    a DMB station for determining whether a broadcast channel with regional conditional access features for regionally limiting reception by a DMB receiving terminal is present among broadcast channels, collecting location information from the DMB receiving terminal, checking a subscriber of the DMB terminal using the location information, and generating and broadcasting reception restriction information for limiting the reception of the broadcast channel for a subscriber according to a region in which the DMB receiving terminal is located; and
    the DMB receiving terminal for limiting reception of the broadcast channel according to the regional conditional access features of the broadcast channel selected by a user and according to whether the reception restriction information has been received for the broadcast channel selected by the user.

2. The DMB system of claim 1, wherein the DMB station collects the location information of the DMB receiving terminal through a mobile communication network.

3. The DMB system of claim 2, wherein the DMB station comprises:
    a broadcast program scheduler for generating channel-by-channel conditional access information including the regional conditional access features when there are broadcast channels with the regional conditional access features for limiting the reception according to the region;
    a subscriber location information collector for collecting the location information of the DMB receiving terminal; and
    a subscriber management system for checking subscribers located in a region in which the reception of the broadcast channel is limited according to the regional conditional access features using the location information of the DMB receiving terminal, and generating the reception restriction information for limiting the reception of the broadcast channel.

4. The DMB system of claim 1, wherein the DMB receiving terminal comprises:
    a location information transceiver for transmitting location information of the DMB receiving terminal to the DMB station.

5. The DMB system of claim 4, wherein the DMB station comprises:
    a broadcast program scheduler for generating channel-by-channel conditional access information including the regional conditional access features when there are broadcast channels with the regional conditional access features for limiting the reception according to the region;
    a subscriber location information collector for collecting the location information of the DMB receiving terminal; and
    a subscriber management system for checking subscribers located in a region in which the reception of the broadcast channel is limited according to the regional conditional access features using the location information of the DMB receiving terminal, and generating the reception restriction information for limiting the reception of the broadcast channel.

6. The DMB system of claim 4, wherein the DMB receiving terminal further comprises:
    an Entitlement Management Message (EMM) extractor for extracting subscriber entitlement information including information indicating if the user can watch broadcast channels on which DMB data is broadcast from the DMB station; and an entitlement information identification module for limiting reception of DMB according to whether the subscriber can watch the DMB based on the entitlement information.

7. The DMB system of claim 1, wherein the DMB station includes the reception restriction information in subscriber entitlement information indicating if the subscriber can watch broadcast channels on a basis of location information of the DMB receiving terminal, and sends the subscriber entitlement information.

8. A conditional access method for regionally limiting Digital Multimedia Broadcasting (DMB) reception in a DMB system with a DMB station and at least one DMB receiving terminals:

determining if there is present a broadcast channel with regional conditional access features for regionally limiting reception by the DMB receiving terminals among broadcast channels in the DMB station;

collecting location information from the DMB receiving terminals in the DMB station;

checking a subscriber of a DMB receiving terminal whose reception of the broadcast channel with the regional conditional access features is limited using the location information, and generating and broadcasting reception restriction information for limiting the reception of the broadcast channel from the DMB station; and limiting the reception of the broadcast channel for a user according to whether the reception restriction information has been received for the broadcast channel selected by the user in the DMB receiving terminal.

9. The conditional access method of claim 8, wherein collecting the location information comprises:

sending a request for current location information of the DMB receiving terminal from the DMB station to a Mobile Positioning Center (MPC) coupled to the DMB receiving terminal; and sending the location information from the MPC to the DMB station.

10. The conditional access method of claim 8, wherein collecting the location information comprises:

detecting that location of the DMB receiving terminal has been changed in a Mobile Positioning Center (MPC) coupled to the DMB receiving terminal; and sending changed location information of the DMB receiving terminal from the MPC to the DMB station.

11. The conditional access method of claim 8, wherein collecting the location information comprises:

receiving location information from a Global Positioning System (GPS) satellite in a preset period in the DMB receiving terminal; and sending the location information from the DMB receiving terminal to the DMB station.

12. The conditional access method of claim 8, wherein broadcasting the reception restriction information comprises:

identifying regions in which subscribers of the DMB receiving terminals are located from the collected location information in the DMB station;

checking channel-by-channel conditional access information of broadcast channels with the regional conditional access features and checking the regional conditional access features of the broadcast channels in the DMB station;

checking subscribers located in a region in which reception is limited according to the regional conditional access features of the broadcast channel from the location information in the DMB station;

generating the reception restriction information for the broadcast channel for the checked subscribers in the DMB station; and broadcasting the generated reception restriction information from the DMB station to the DMB receiving terminal.

13. The conditional access method of claim 12, wherein checking the subscribers located in the region in which the reception is limited comprises:

checking the subscribers located in the region in which the reception is limited according to the regional conditional access features of the broadcast channel from the location information in the DMB station;

checking subscriber information of the checked subscribers and determining if the reception of the broadcast channel for the subscribers is limited according to the regional conditional access features in the DMB station; and checking reception restriction of the broadcast channel for the subscribers whose reception of the broadcast channel is limited according to the regional conditional access features in the DMB station.

14. The conditional access method of claim 12, wherein broadcasting the reception restriction information comprises:

including the reception restriction information in subscriber entitlement information indicating if the subscriber can watch a specific broadcast channel on a basis of subscriber information in the DMB station; and broadcasting the subscriber entitlement information including the reception restriction information from the DMB station to the DMB receiving terminal.

15. The conditional access method of claim 14, wherein the subscriber entitlement information is an Entitlement Management Message (EMM).

16. The conditional access method of claim 8, wherein the step of limiting the reception comprises:

when the reception restriction information is not received, generating a descrambling key for descrambling a scrambled broadcast signal sent from the DMB station in the DMB receiving terminal.

\* \* \* \* \*

UNITED STATES PATENT AND TRADEMARK OFFICE
CERTIFICATE OF CORRECTION

PATENT NO.       : 7,587,168 B2
APPLICATION NO.  : 11/435514
DATED            : September 8, 2009
INVENTOR(S)      : Lee et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 640 days.

Signed and Sealed this

Twenty-first Day of September, 2010

David J. Kappos
*Director of the United States Patent and Trademark Office*